United States Patent
Lee et al.

(10) Patent No.: US 7,024,498 B2
(45) Date of Patent: Apr. 4, 2006

(54) APPARATUS FOR RECEIVING DATA PACKET ELIMINATING THE NEED OF A TEMPORARY MEMORY AND MEMORY CONTROLLER AND METHOD THEREOF

(75) Inventors: Jae Sung Lee, Daejon (KR); Young Woo Kim, Seoul (KR); Sung Nam Kim, Daejon (KR); Sang Man Moh, Daejon (KR); Yong Youn Kim, Daejon (KR); Myung Joon Kim, Daejon (KR); Kee Wook Rim, Daejon (KR)

(73) Assignee: Electronics and Telecommunications Research Institute, (KR)

( * ) Notice: Subject to any disclaimer, the term of this patent is extended or adjusted under 35 U.S.C. 154(b) by 260 days.

(21) Appl. No.: 10/460,919

(22) Filed: Jun. 13, 2003

(65) Prior Publication Data

US 2004/0093443 A1    May 13, 2004

(30) Foreign Application Priority Data

Nov. 11, 2002    (KR)    ...................... 10-2002-0069556

(51) Int. Cl.
*G06F 3/00*    (2006.01)
(52) U.S. Cl. ............................ 710/52; 710/53; 710/56; 365/189.01; 365/230.01
(58) Field of Classification Search .................. 710/52, 710/53, 56; 365/189.01, 230.01
See application file for complete search history.

(56) References Cited

U.S. PATENT DOCUMENTS

| 5,594,700 | A | 1/1997 | Ward et al. |
| 6,678,861 | B1* | 1/2004 | Jones et al. ................. 714/781 |
| 2003/0227943 | A1* | 12/2003 | Hallman et al. ............ 370/503 |
| 2004/0047367 | A1* | 3/2004 | Mammen .................... 370/472 |

FOREIGN PATENT DOCUMENTS

| KR | 211978 | 5/1999 |
| KR | 2000046371 | 7/2000 |

* cited by examiner

*Primary Examiner*—Kim Huynh
*Assistant Examiner*—Justin Knapp
(74) *Attorney, Agent, or Firm*—Blakely Sokoloff Taylor & Zafman (57) ABSTRACT

A device for effectively and economically receiving a packet by eliminating temporary memory and a memory controller. The apparatus includes an inspection logic circuit for inspecting data units as soon as they arrive in order to find an error included in the packet and generating control signals according to a result of inspecting a data unit; a multiplexer for receiving data units and distributing the received data units as soon as the data units have arrived; and FIFO memories for receiving the data unit, storing the data unit in a corresponding one of FIFO memories and either deleting or completing storing data units according to the control signals from the inspection logic circuit. The present invention can reduce manufacturing cost of the device by eliminating a temporary memory and a memory controller for the temporary memory and can also reduce processing time.

10 Claims, 8 Drawing Sheets

| (write_allow,waddr_bound_load,waddr_load) | OPERATION |
|---|---|
| 100 | waddr_plus_2 <= waddr_plus_2 + 1;<br>waddr <= waddr + 1; |
| 110 | waddr_plus_2 <= waddr_plus_2 + 1;<br>waddr <= waddr + 1;<br>waddr_bound_plus_2 <= waddr_plus_2;<br>waddr_bound <= waddr; |
| 101 | waddr <= waddr_bound + 1;<br>waddr_plus_2 <= waddr_bound_plus_2 +1; |
| 010 | waddr_bound_plus_2 <= waddr_plus_2;<br>waddr_bound <= waddr; |
| 001 | waddr_plus_2 <= waddr_bound_plus_2;<br>waddr <= waddr_bound; |
| ETC. | NO OPERATION |

APPARATUS FOR RECEIVING DATA PACKET ELIMINATING THE NEED OF A TEMPORARY MEMORY AND MEMORY CONTROLLER AND METHOD THEREOF

BACKGROUND

1. Field of the Invention

The present invention relates to an apparatus and a method for receiving a data packet; and, more particularly, to an apparatus and a method for receiving a data packet by maximally utilizing a bandwidth of an input/output channel and a network communication.

2. Description of Related Arts

Figure 1:
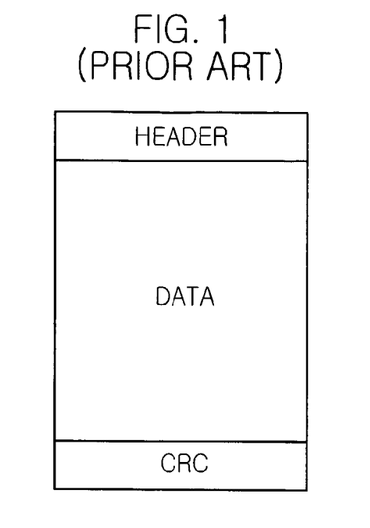
FIG. 1 is a diagram showing a format of a packet generally used in conventional data communication in a computer network or various data input/output computer devices.

FIG. 1 is a diagram showing a format of a packet generally used in conventional data communication in a computer network or various data input/output computer devices. Referring to FIG. 1, the packet is generally constructed with multiple fields such as header, data and a cyclic redundancy check CRC. For data communication, the packet is divided into a plurality of data units according to a data communication method. The data unit is a smallest unit for transmitting the packet and it is usually 1–4 bytes of data. Each of the data units is individually transmitted and received. For detecting any errors included in the packet, the packet is inspected by checking a redundancy bit included in each of the data units to calculate a CRC value at a receiver side. The calculated CRC value of the receiver side is compared to a CRC value of a transmitter side. If they are different then an error occurred. Therefore, all data units of the packet have to have arrived for calculating the CRC value. After inspecting all the data units, if there are any errors, the packet is deleted. If there are no errors, the packet is passed to the higher layer for the next processing of the packet.

Figure 2A:
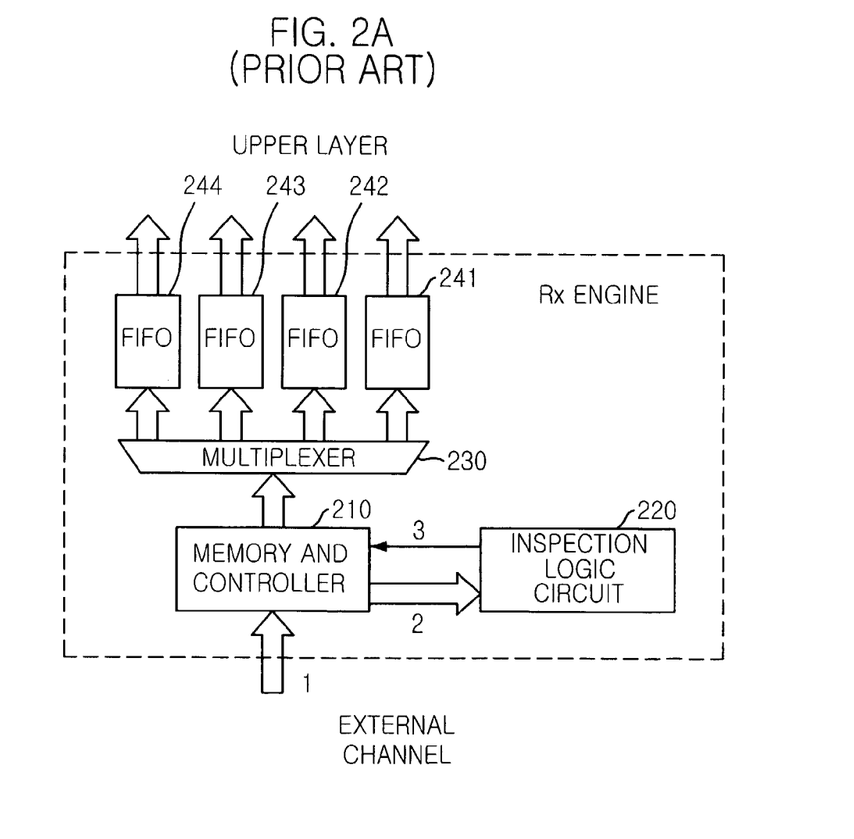
FIG. 2A is a diagram illustrating a conventional apparatus for receiving data packets.

FIG. 2A is a diagram illustrating a conventional apparatus for receiving data packets. Referring to FIG. 2A, the conventional data packet receiver includes a memory & controller 210 for temporally storing received data units 1 and outputting stored data units to a multiplexer 230 according to an error detection signal 3; an inspection logic circuit 220 for performing an error checking process on stored data units 2 and generating the error detection signal 3 to the memory & controller 210, a multiplexer 230 for distributing the received data packet 4 from the memory & controller 210 to a plurality of first-in-first out memories (FIFO) 241 to 244 where the plurality of first-in first-out FIFO Memories 241 to 244 store the data packet from the multiplexer 230 and output the data packets to a higher layer. The higher layer represents the next step of processing the received packet.

Detailed operations of the conventional data packet receiver are explained hereinafter.

The received data packets are stored at the memory & controller 210 and the stored data packet is inspected for detecting error by the inspection logic circuit 220. If there is no error found in the stored data packet, the stored data packet is passed to the higher layer through the FIFO memories 241 to 244.

Figure 2B:
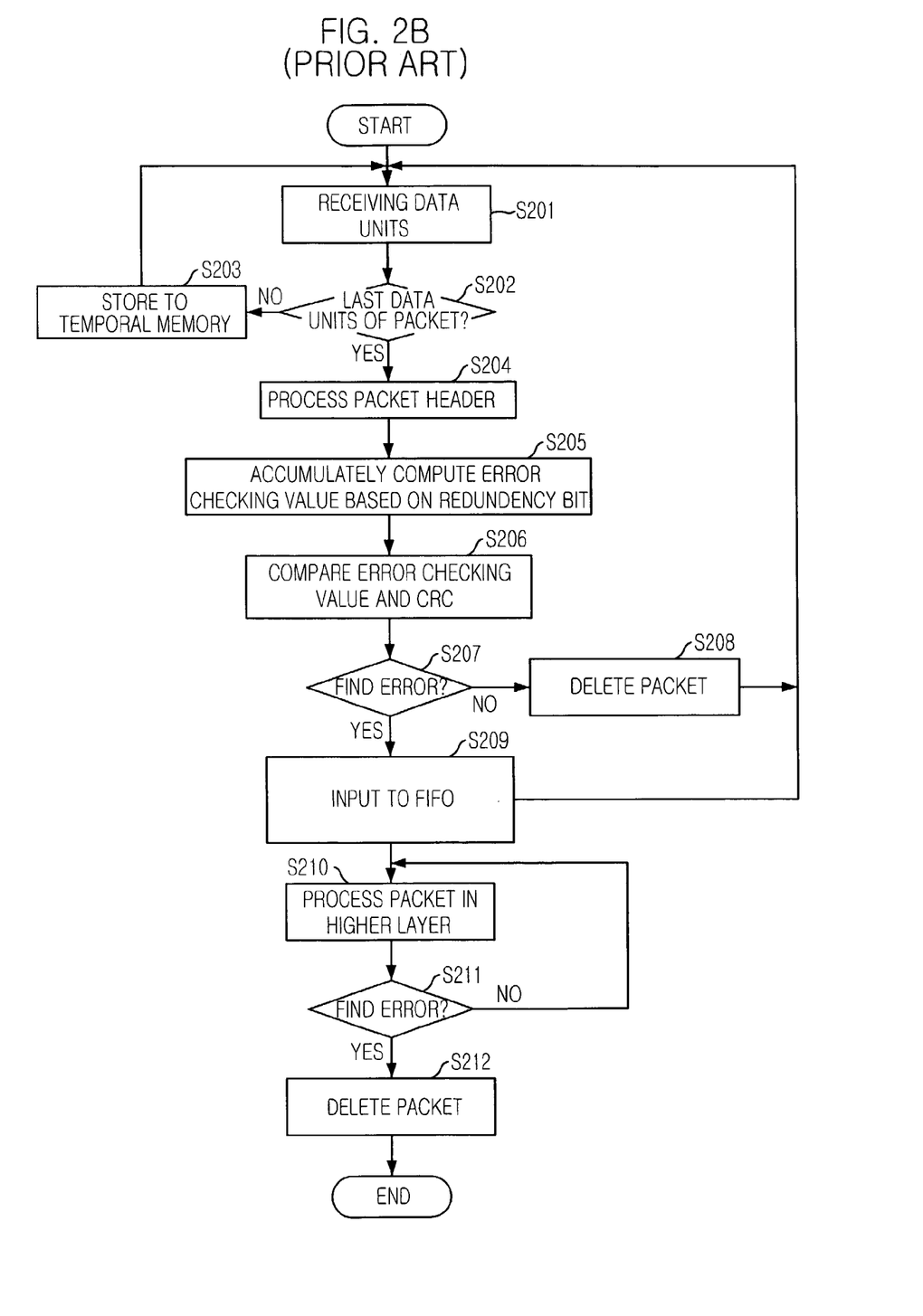
FIG. 2B is a flowchart for showing a conventional method for receiving data packets.

FIG. 2B is a flowchart for showing a conventional method for receiving a data packet. Referring to FIG. 2B, a data packet consists of multiple data units. A data unit is received at step S201. If the received data unit is not the last data unit of a corresponding data packet at step S202, then the received data unit is stored in a temporary memory space at step S203, and the next data unit is received at step S201. If the received data unit is the last data unit of the data packet at step S202, a field of a packet header is appropriately processed at step S204. After processing the packet header, a field of data is processed and redundancy bits included in each of the data units are processed for detecting error at step S205. At step S206, the cyclic redundancy check code in the last field of the packet and redundancy bits in every data unit are compared, and it is determined whether an error is included in the packet according to a result of the comparison at step S207. If an error is found the packet is dumped at step S208 and if an error is not found the packet is inputted to the FIFO memory at step S209 and passed to the higher layer. The packet is processed at step S210. If there is no error found at step S211, the packet is processed again at step S210, and if there is an error found, the packet is dumped at step S212.

As mentioned above, the conventional method for receiving the data packet and inspecting the data packet for finding errors are time consuming processes since every data unit of the packet needs to have arrived before starting to inspect, and also requires plenty of space for temporary storing the data units of the data packet before finding an error in the data packet.

Therefore, a size of memory for buffering or storing the received data packet needs to be increased in order to process high-speed incoming data packets of a next generation standard of data network communication and high-speed input/output devices, such as InfiniBand, Giga-Bit Ethernet, a RapidIO and PCI Express. By increasing the memory size, a cost is also increased and it requires a complicated control mechanism. Furthermore, electric power consumption is also increased.

Figure 3:
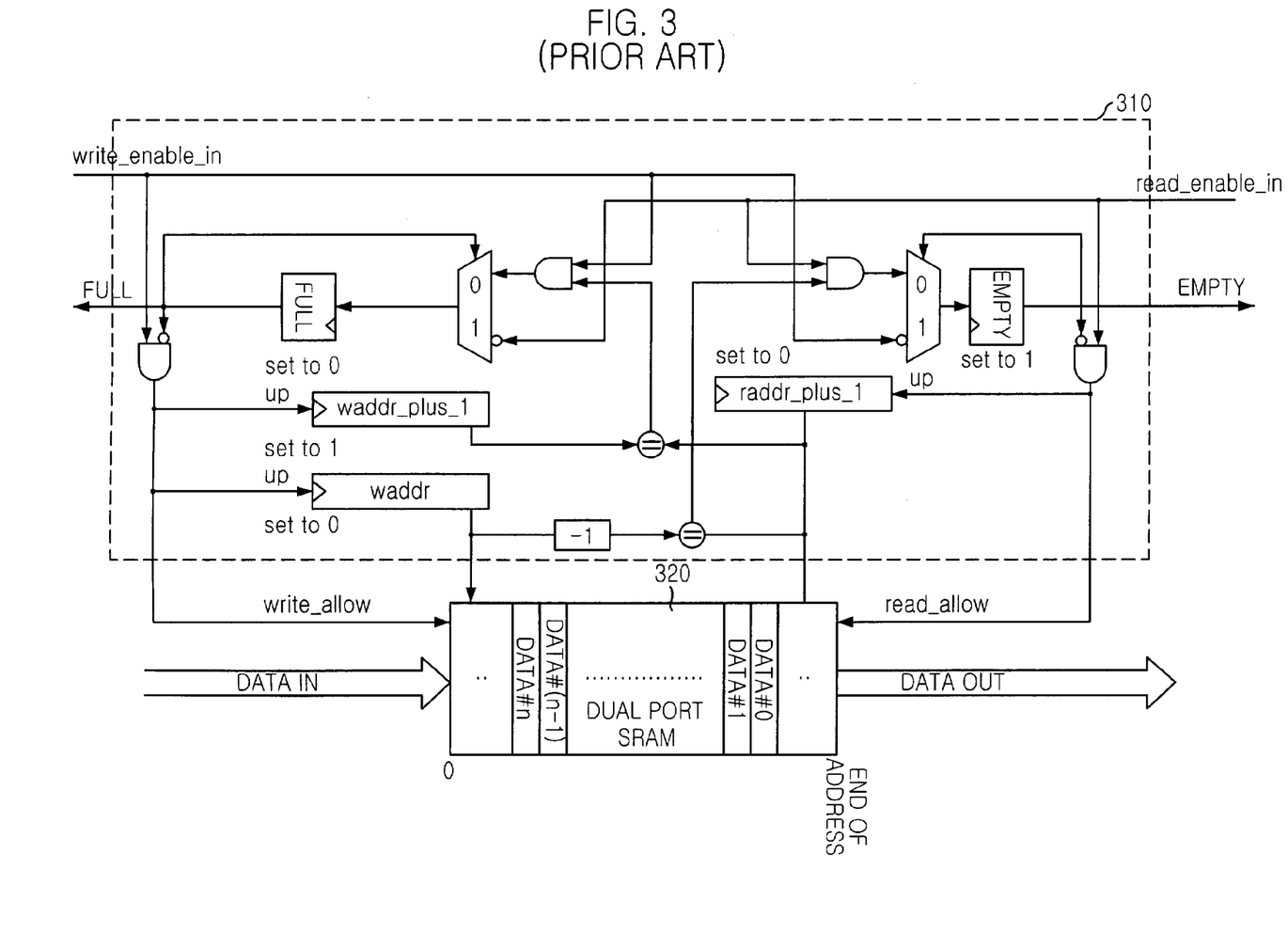
FIG. 3 is a block diagram illustrating a plurality of FIFO memories 241 to 244 equipped in the conventional data packet receiver.

FIG. 3 is a block diagram illustrating a plurality of FIFO memories 241 to 244 equipped in the conventional data packet receiver. Referring to FIG. 3, the conventional FIFO memories 241 to 244 include a dual-port SRAM 320 and a FIFO memory controller 310. The FIFO memory controller 310 generates an empty signal or a full signal according to data address state of dual port SRAM 320. The FIFO memory controller 310 generates and outputs a write address and activates a write_allow signal when the full signal is inactivated and a write_enable_in signal is activated. Also, the FIFO memory controller 310 generates and outputs a read address when a read_enable_in signal is activated and the empty signal is inactivated. The dual port SRAM 320 stores data at the write address received from the FIFO memory controller 310 when the write_allow signal is activated. If the read_allow signal is activated, the dual port SRAM 320 outputs data stored at the read address received from the FIFO memory controller 310.

As mentioned above, the conventional data packet receiver using FIFO memory needs to receive all data units of one packet before inputting the received data units to FIFO memory. Because the conventional FIFO memory cannot dump one specific data unit stored during receiving other data units, the received packet has to be inspected for finding errors before inputting the packet to the FIFO memory. For overcoming the above-mentioned method, an enhanced FIFO memory circuit is developed. The enhanced FIFO memory stores packets into a register file by assigning a store-address to each packet.

A huge size of memory space and registers, however, are also required in the enhanced FIFO memory in case of continuously receiving a great quantity of minimum size packets. Therefore, complexity is increased for controlling the memory and distributing memory space.

SUMMARY

It is, therefore, an object of the present invention to provide an apparatus and a method for receiving a data packet in order to maximally utilize a channel and bus bandwidth and minimize cost of hardware by eliminating conventional problems of FIFO memory.

In accordance with an aspect of the present invention, there is provided an apparatus for receiving a packet, which consists of a plurality of data units, the apparatus including: an inspection logic circuit for accumulatively computing an error checking value based on a redundancy bit included in each data unit by analyzing each data unit of a packet as soon as each data unit is arrives and generating control signals, which are an error-off signal and an error-on signal, according to comparison of the accumulatively computed error checking value and a cyclic redundancy check (CRC) included in a last data unit of the packet when the last data unit of the packet has arrived; a multiplexer for receiving data units and distributing the received data units as soon as the data units have arrived; and a plurality of first-in and first-out FIFO memories for receiving the data unit from the multiplexer as soon as the data unit has arrived, storing the data unit in a corresponding one of FIFO memories and deleting or completing storing data units of a corresponding packet according to the control signals from the inspection logic circuit.

In accordance with an aspect of the present invention, there is also provided a method for receiving a packet, which consists of a plurality of data units, the method including receiving a data unit; analyzing the data unit and simultaneously distributing the data unit to a corresponding FIFO memory; performing appropriate processes according to a result of analyzing, performing simultaneously an error checking process by accumulatively computing an error checking value based on a redundancy bit included in each data unit and finally comparing the accumulated computed error checking value with CRC values sent from the transmit side of a corresponding packet as soon as the last data unit has arrived; dumping the data units of the corresponding packet, if there is an error found as a result of comparing; and processing data units outputted from the FIFO memories if there is not an error found as a result of the comparing.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION

Other objects and aspects of the invention will become apparent from the following description of the embodiments with reference to the accompanying drawings, which is set forth hereinafter.

Figure 4:
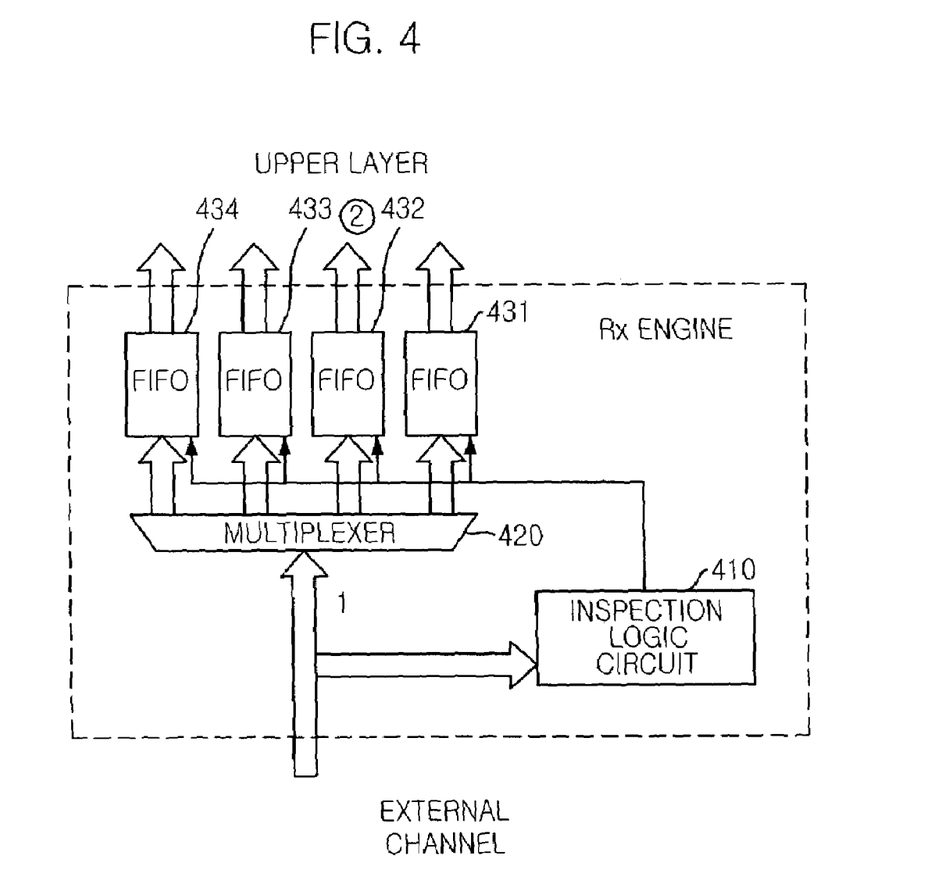
FIG. 4 is a diagram for illustrating an apparatus for receiving a data packet in accordance with a preferred embodiment of the present invention.

FIG. 4 is a diagram for illustrating an apparatus for receiving a data packet in accordance with a preferred embodiment of the present invention. The apparatus includes an inspection logic circuit 410, a multiplexer 420 and a plurality of first-in first-out (FIFO) memories 431 to 434.

The inspection logic circuit 410 receives data units 1 and analyzes data units to classify in order to perform an appropriate process, and analyzed a redundancy bit in order to check for errors included in the data packet. For data communication, the packet is divided into a plurality of data units according to a data communication method. The data unit is the smallest unit for transmitting the packet and it is usually 1–4 bytes of data. An error checking value is accumulatively computed and updated as soon as each data unit has arrived. When all data units of the packet have arrived, including a CRC calculated at a transmitter side of the corresponding packet, the error checking process is completed by comparing the CRC with the accumulatively computed error checking value. According to a result from the error checking process, a control signal of FIFO memory is generated. If there is an error found, an error-on signal is generated. The FIFO memory dumps the data units included in the corresponding packet having an error when the error-on signal is received. If there is no error found, then an error-off signal is generated and the FIFO memory stores the data units corresponding to the packet according to the error-off signal. The multiplexer 420 receives the data packet (1) and distributes the received data units to FIFO memories 431 to 434.

In the mean time, the plurality of FIFO memories 431 to 434 receives the error-on signal and the error-off signal from the inspection logic circuit 410. According to the signals, the plurality of FIFO memories completes receiving the data units or dumping the data units. After completing receiving the data units included in a corresponding packet, the packet is passed to the higher layer and it is processed according to a content of the packet.

In the above-mentioned present invention, a temporary memory and a memory controller for the temporary memory are not required. The received data units can be directly stored in the FIFO memories 431 to 434. As a result, delay time for storing the data units in the temporary memory and controlling time for error checking included in the packet and bottle-neck problem can be eliminated. Therefore, the present invention effectively processes the data units of the packet.

To implement the above-mentioned method, newly designed FIFO memory is used. The new FIFO can dump the data units previously stored according to a result of inspecting, as soon as receiving the corresponding packet in the FIFO memories 431 to 434. Therefore, the data units stored in FIFO should be hidden from an output controller of FIFO before the error checking process of a corresponding packet is completed. Also, the FIFO can delete or dump the data unit included in a corresponding packet for reducing processing time or bottle-neck problems.

In other conventional apparatus for receiving a packet, addresses of data units stored in a memory are stored in register files for distinguishing a boundary between packets in memory. However, a size of the register files would be increased by a geometric progression in case small size packets continuously arrive.

Figure 5:
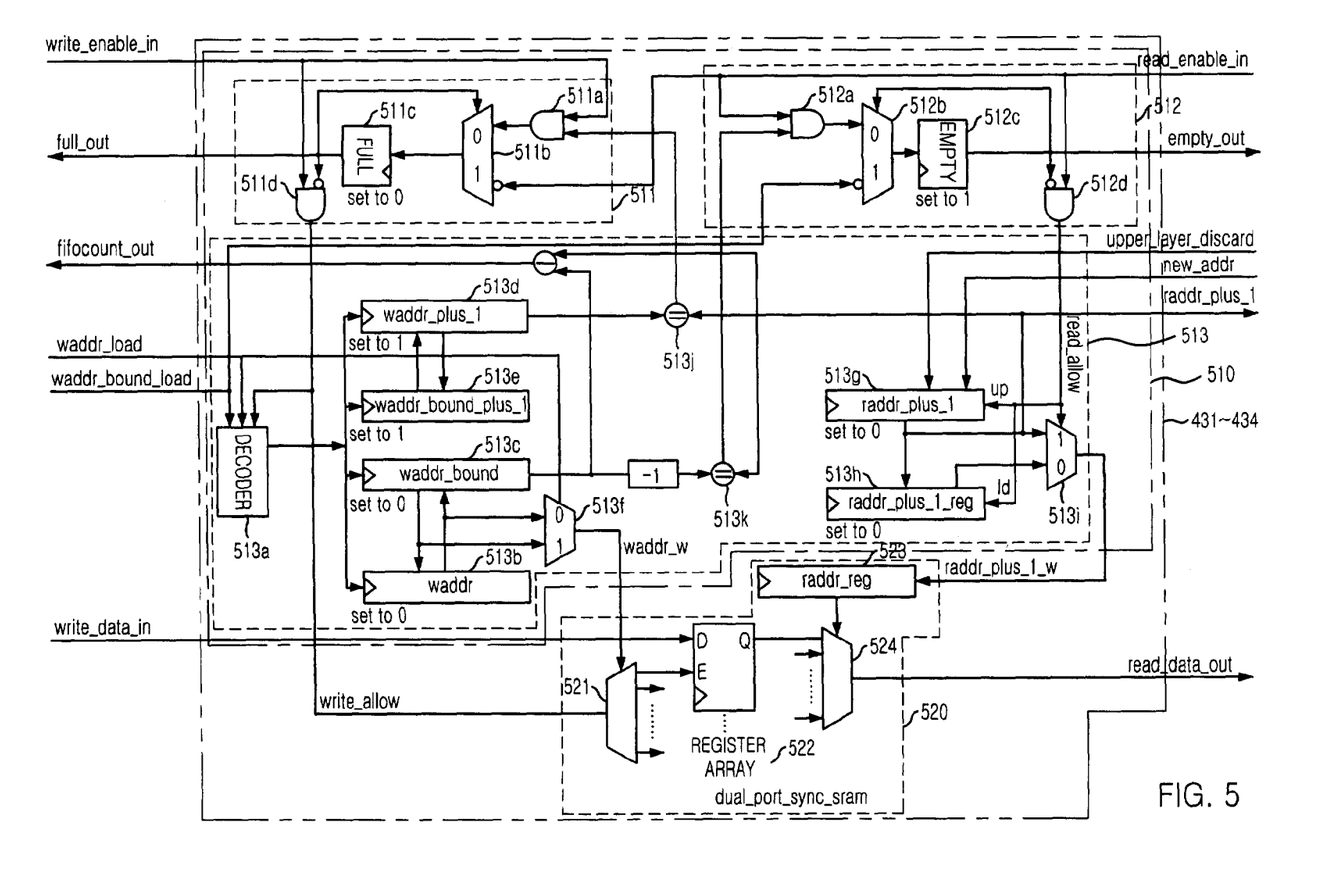
FIG. 5 is a block diagram showing the FIFO memories 431 to 434 equipped in the data packet receiving apparatus in accordance with an embodiment of the present invention.

FIG. 5 is a block diagram showing the FIFO memories 431 to 434 equipped in the data packet receiving apparatus in accordance with an embodiment of the present invention. The FIFO memories in FIG. 5 are newly designed for the present invention. Referring to each of the FIFO memories 431 to 434, each includes a memory controller 510 and a dual port synchronous memory 520.

The memory controller 510 generates a full signal (Full_Out) or an empty signal (empty_out) and activates a write enable signal (write_enable_in). The memory controller 510 also generates and outputs a write address (waddr_w) when the pull_out signal is un-activated and a write_allow signal is activated. Also, a read address signal (addr_plus__1_w) is generated and outputted when a read enable signal (read_enable_in) signal is activated and an empty signal is un-activated. Furthermore, the memory controller 510 controls the FIFO by receiving the control signals such as the error-on signal waddr_load and error-off signal waddr_bould_load, and controls a value of the write address (waddr_w). The memory controller 510 also outputs the read address copied data (raddr_plus__1) to the higher layer and receives the upper_layer_discard signal from the higher layer and new address signal (new_addr) according to read address copied data (raddr_plus__1). Based on the signals received from the higher layer, the memory controller 510 can control whether the data packet is eliminated or stored.

Hereinafter, detailed operations of the memory controller 510 are explained in detail.

The memory controller 510 includes a first signal generator 511, a second signal generator 512 and an address controller 513.

The first signal generator 511 receives the following signals write_enable_in, read_enable_in and a first control signal, and generates the empty_out signal and the write_allow signal based on logical values of the received signals.

The first signal generator 511 includes a first AND gate 511a, a first selector 511b, a full register 511c, and a second AND gate 511b.

The first AND gate 511a receives the write_enable_in signal and a first control signal and outputs a result value of an AND operation.

The first selector 511b selects and passes an output signal of the first AND gate 511a when the Full_out signal is a first logical step, which is '0'. Also, the first selector 511b selects and passes a reversed value of the read_enable_in signal when the Full_out signal is a second logical step, which is '1'.

The full register 511c is set as '0' at initialization and receives and stores a signal from the first selector 511b.

The second AND gate 511d receives an output signal of the full register 511c and the write_enable_in signal and computes an AND operation with the output signal and the write_enable_in signal. After computing the AND operation, the result of the AND operation is outputted as a write_allow signal.

The second signal generator 512 receives the packet error-on signal (waddr_bound_load), the read_enable_in signal and a second control signal and generates the empty_out signal and the read_allow signal according to logical values of the received signals, such as waddr_bound_load, the read_enable_in signal and the second control signal.

The third AND gate 512a receives the read_enable_in signal and the second control signal and computes an AND operation with the received signals.

Also, the second selector 512b selects and passes an output signal of the third AND gate 512a when the empty_out signal is the first logical step, which is '0' and selects and passes the reversed value of the error-off signal (waddr_bound_load) when the empty_out signal is the second logical step, which is '1'.

The empty register 512c is set as '1' at initialization and the signal from the second selector 512b is inputted and stored.

Also, the fourth AND gate 512d receives the reversed value of the output signal of the empty register 512c and the read_enable_in signal and computes the AND operation with the two received signals. A result of the AND operation is outputted as the read_allow signal.

The address controller 513 receives the write_allow signal from the first signal generator 511, the error-on signal (waddr_load) and error-off signal (waddr_bound_load) and generates the write address (waddr_w) according to the received signals. The write address (waddr-w) is outputted to the dual port synchronization memory 520. Also, the address controller 513 outputs the read address copy data (raddr_plus__1) to the higher layer. Furthermore, the address controller 513 receives the read_allow signal from the second signal generator 512 and new address according to the read address copy data (raddr_plus__1) and generates the read address (raddr_plus__1_w) according to the received signals. The generated read address (raddr_plus__1_w) is outputted to the dual port synchronization memory 520. The address controller 513 also generates the first control signal and the second control signal and outputs the first and second control signals to the first and second signal generators 511 and 512.

Hereinafter, the address controller 513 is described in more detail.

The address controller 513 includes a first write address register 513b, a first write boundary address register 513c, a second write address register 513d, a second write boundary address register 513e, a third selector 513f, a read address register 513g, a copy register 513h, a fourth selector 513i, a first comparator 513j and a second comparator 513k.

The first write address register 513b is set as '0' at initialization and receives and stores an output address data of the decoder 513a and the first write boundary address data.

The first write boundary address register 513c is set as '0' at initialization and receives and stores the output address data from the decoder 513a and the address data from the first write address register 513b. The stored data is outputted to the first write address register 513b as the first write address boundary address data.

The second write address register 513d is set as '1' at initialization. The second write address register 513d also receives and stores the output address data of the decoder 513a and the second write address data.

The second write boundary address register 513e is set as '1' at initialization. The second write address register 513e receives the output address data of the decoder 513a and stores the output address data of the decoder by adding '1'.

The second write boundary address register 513e also stores address data of the second write address register 513d and outputs the stored data to the second write address register 513d as the second write boundary address data.

The third selector 513f receives the packet error-on signal (waddr_load) and outputs the address data of the first write address register 513b to the dual port synchronization memory 520 as the write address (waddr_w) when the error-on signal (waddr_load) is the first logical step, which is '0'. Also, the third selector 513f outputs the first write boundary address (waddr_load) to dual port synchronization memory 520 as the write address (waddr_w) when the error-on signal (waddr_load) is the second logical step, which is '1'.

The read address register 513g is set as '0' at initialization. Also, the read address register 513g receives the read_allow signal from the second signal generator 512 and the packet dump signal (upper_layer_discard) from the higher layer and outputs the stored address data (raddr_plus__1) according to the packet discard signal (upper_layer_discard). Furthermore, the read address register 513g receives the new address (new_addr) from the higher layer and stores it.

The copy register 513h copies and stores the stored data of the read address register 513g based on the read allow signal (read_allow).

The fourth selector 513i outputs an output data of the copy register 513h as a read address (raddr_plus__1_w) when the read_allow signal is the first logical step, which is '0'. Also, the fourth selector 513i outputs an output data of the read address register 513g as the read address (raddr_plus__1_w) when the read allowance signal (read_allow) is the second logical step, which is '1'.

The first comparator 531j compares an output data of the second write address register 513d and output data of the read address register 513g and generates the first control signal according to a result of comparison.

The second comparator 513k compares a value of the result of subtracting an output of the first write boundary address register 513c by 1 and an output data of the read address register 513g, and according to a result of the comparison, the second comparator 513k generates the second control signal.

The dual port synchronization memory 520 stores input data (write_data_in) at the write address (waddr_w) received from the memory controller 510 and outputs the store data corresponding to the read address received from the memory controller 510 when the write allowance signal (write_allow) is activated. That is, the FIFO memory of the present invention uses dual-port synchronous random access memory (RAM) since it is fast to access and can be effectively designed by dividing the input and output.

Hereinafter, the dual port synchronous memory 520 is described in more detail.

The dual port synchronous memory 520 includes a first selector 521, a register array 522, a read address register 523 and a second selector 524.

The first selector 521 receives the write address signal (waddr_w) and outputs a first selection signal when the write allowance signal (write_allow) is activated.

The register array 522 enables corresponding registers according to the first selection signal inputted from the first selector 521 and stores the input data (write_data_in) at corresponding registers.

The read address register 523 receives and stores the read address (raddr_plus__1_w) inputted from the memory controller 510.

The second selector 524 receives the read address (raddr_plus__1_w) from the read address register 523 and outputs the stored data at a register of the read address (raddr_plus__1_w) among the register array 522.

Figure 6:
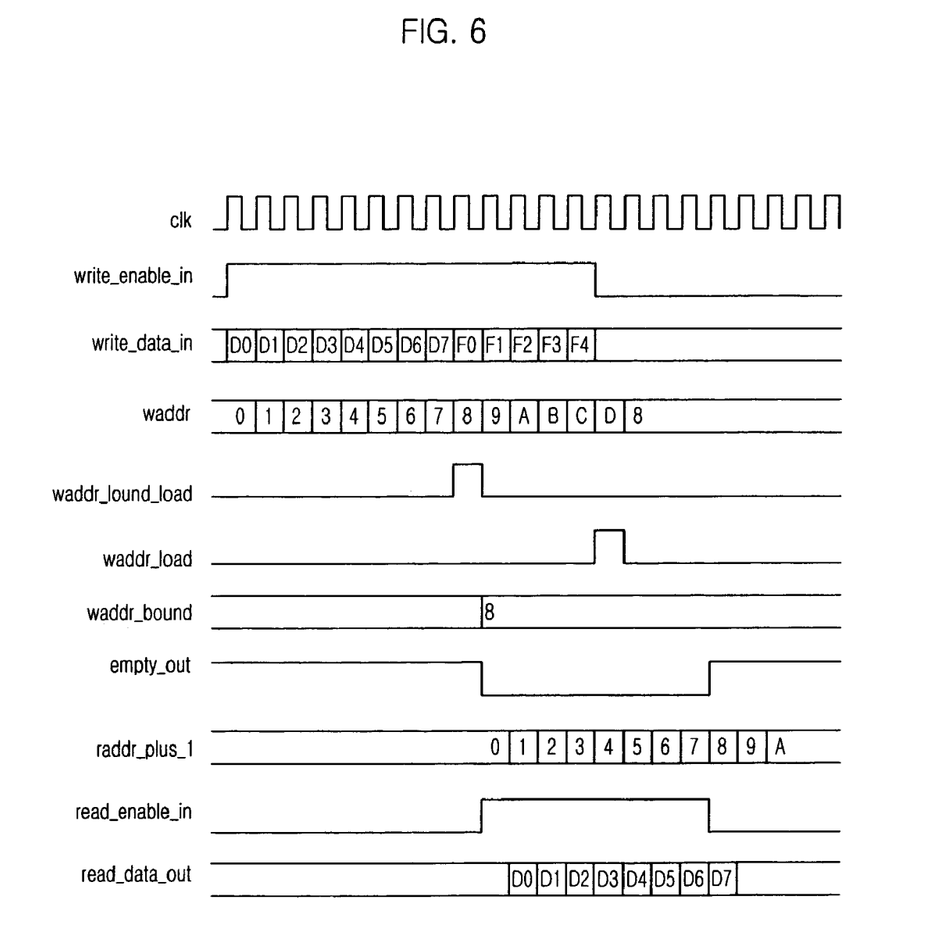
FIG. 6 is a timing diagram showing operations of a data packet receiver of the present invention.
Figure 7:
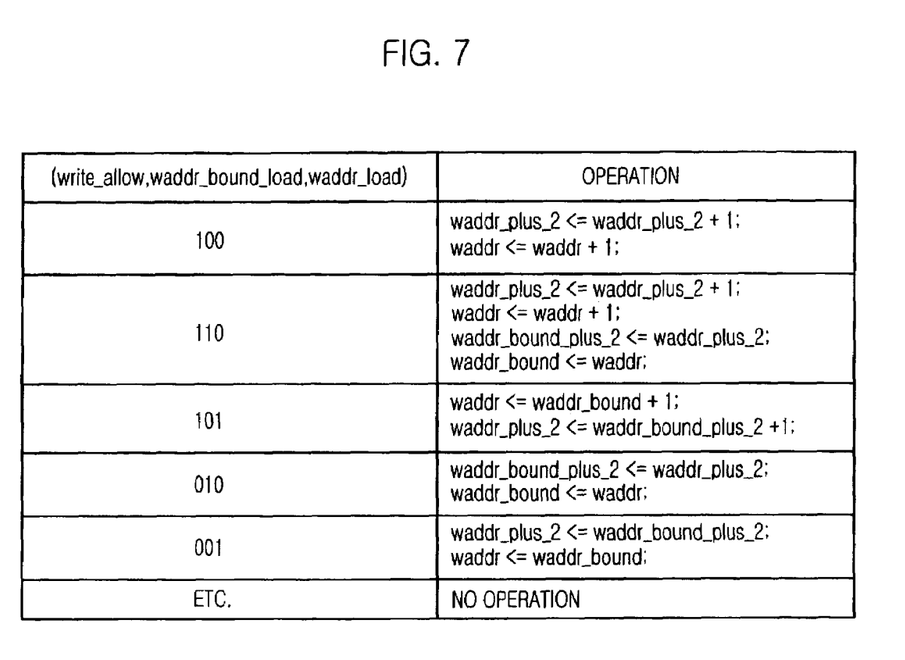
FIG. 7 is a table explaining operations of an apparatus for receiving a packet in accordance with a preferred embodiment of the present invention.

FIG. 6 is a timing diagram showing operations of a data packet receiver of the present invention.

The FIFO memory is generally classified as synchronous and non-synchronous according to a clock signal used at an input end and output end. Usually, synchronous FIFO is used for high speed input and output data. Therefore, clocks and reset signals applied to all registers in FIG. 5 are commonly used and it was omitted in FIG. 5 for reducing complexity of drawing. The values of each of the registers are 0 or 1 at initialization. A width and depth of memory can vary according to application area. However, the number of bits in the input/output data unit, which is the width of the memory, has to be matched to the number of bits of the write_data_in signal and the read_data_out signal. The depth of memory represents the number of data units that can be stored in the memory. Therefore, the depth of memory is predetermined by the number of bits of the plurality of registers, which stores addresses in memory, and needs to be identical to the number of bits when the memory depth is represented as binary numbers. The memory depth has to be the binary number. If it is not, an address calculator is additionally required. The empty register 512c and the full register 511c are one bit registers.

A method for inputting data in the FIFO memory in FIG. 5 is identical to the conventional method. That is, when the full signal (full_out) is the first logical stage, which is low, it is possible to input data and when an input word data is applied to the write_data_in bus and the write_enable_in signal is the second logical stage, which is high, data can be inputted at an ever rising edge of the empty signal.

The first write address register 513b stores an address value of the location for storing a data unit of a packet currently inputted to the memory. The first write boundary address register 513c indicates an address of a location, which is next of the last word data of the previous packet. Also, the address indicated by the first write boundary address register 513c is the same address for a first location of storing a packet currently inputted to the memory. At the initialization of the FIFO memory circuit, the first write address register 513b and the first write boundary write register 513c are set as '0'. After initialization, the value of the first write address register 513b is increased by one such as 1, 2 3 whenever the data unit is inputted in manner of one by one. However, the value of the first write boundary address register 513c is not increased until inputting of a packet is completed. After completing inputting of the packet, the value of the first write boundary address register 513c is determined according to a result of the inspection logic circuit. That is, when the packet does not include errors, the error-off signal (waddr_bound_load) is the second logic stage, and the first write boundary address register 513c stored the value of the first write address register 513c. And the empty register 512c becomes the first logical stage (low) from the second logical stage (high). By becoming the first logical stage, the higher layer will notice that there is a packet to be passed to the higher layer. If the packet does include an error, the error-on signal (waddr_load) becomes the second logical stage (high) and the packet will be dumped by storing the first write boundary address register 513c, which is 0, to the first write address register 513c.

Figure 8:
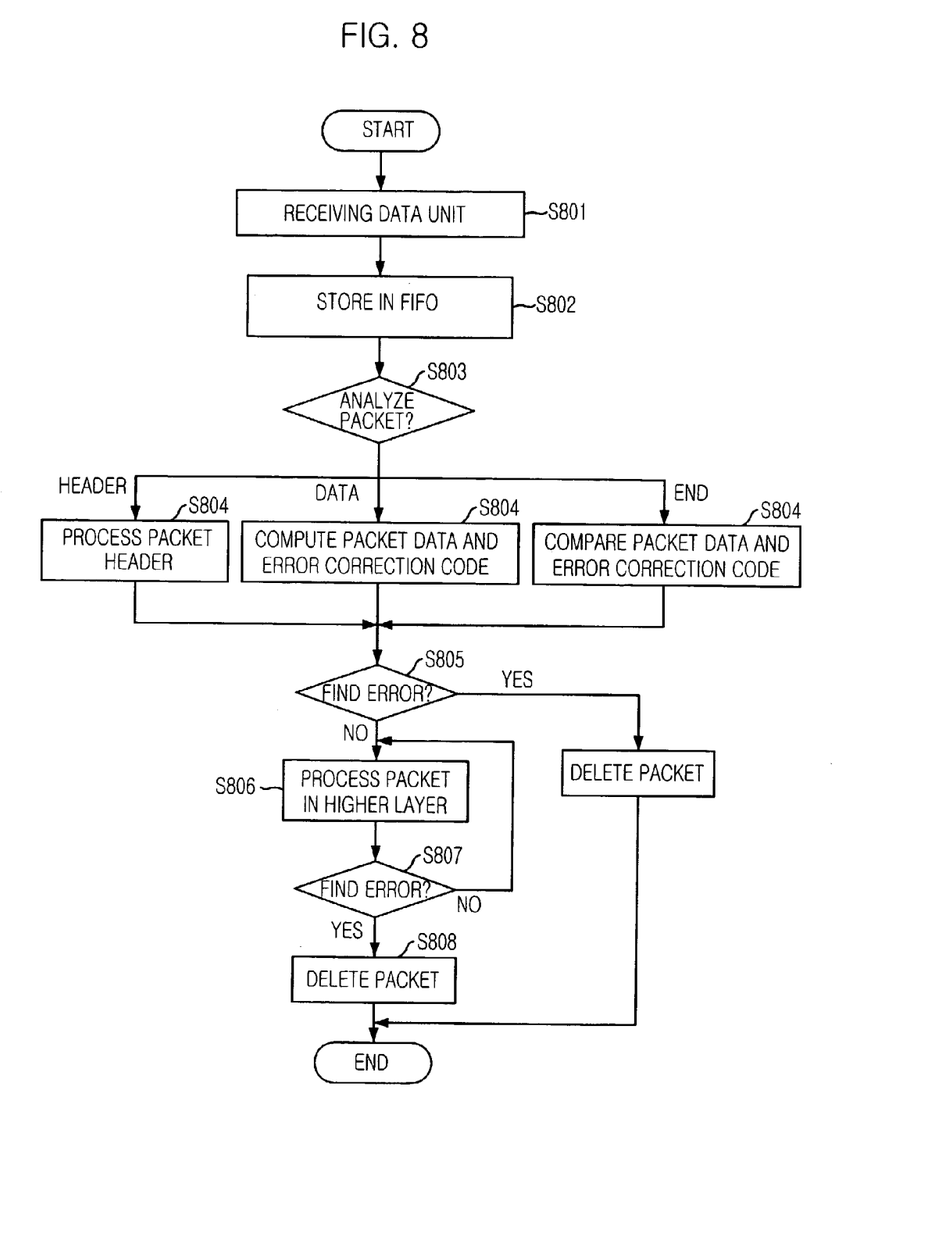
FIG. 8 is a flowchart for explaining a method for receiving a data packet in accordance with a preferred embodiment of the present invention.

FIG. 8 is a flowchart for explaining a method for receiving a data packet in accordance with a preferred embodiment of the present invention.

Referring to FIG. 8, an inspection logic circuit 410 and a multiplexer 420 receives data units of a packet at step of S801. The multiplexer 420 distributes the data units to the corresponding FIFO memories 431 to 434 and the inspection logic circuit 410 analyzes the data units at step of S802.

The inspection logic 410 performs an appropriate process according to a result of analysis of step S802 at step S803. For example, if the data unit is a part of a packet header then the inspection logic circuit 410 performs appropriate processes for the packet header, and if the packet data word is a part of data then the inspection logic 410 performs an appropriate process for packet data. Also, at step of S803, an error checking process is performed for every data unit. Each of the data units contain a redundancy bit and an error checking value is accumulatively computed based on the redundancy bit of every data unit as soon as each of the data units have arrived. When the last of the data units of a corresponding packet has arrived, the inspection logic circuit compares the error checking value accumulatively computed based on the redundancy bits of the packet and the CRC, which is included in the last data unit.

After step of S803, the inspection logic circuit 410 generates a control signal in order to dump or store the data units included in the corresponding packet at step S804. A step for dumping the packet is completed in one clock cycle.

If the error is not found then the packet from the FIFO memories 431 to 434 are passed to the higher layer at step of S805.

After passing the packet to the higher layer, it is determined whether the error is included in the packet at the higher layer at step of S806. If there is an error, then the packet is dumped at step of S807. This is also completed in one clock cycle.

As mentioned above, the present invention can reduce manufacturing cost of the apparatus for receiving packets by eliminating a temporary memory and a memory controller for the temporary memory and also reduce processing time of receiving packets by directly storing data units as soon as the data units have arrived. Furthermore, by reducing the processing time for receiving the packet, the present invention can be implemented for high speed data communication since the present invention can process a high speed packet stream which has been demanded for currently introduced data communication and input/output computerized device standards. Also the present invention dumps the whole packet within one clock cycle instead of spending numerous clock cycles, which can be as much as the number of packets to be dumped for dumping the packets.

While the present invention has been described with respect to certain preferred embodiments, it will be apparent to those skilled in the art that various changes and modifications may be made without departing from the scope of the invention as defined in the following claims.

What is claimed is:

1. An apparatus for receiving a packet, which includes a plurality of data units, the apparatus comprising:
    an inspection logic circuit for accumulatively computing an error checking value based on a redundancy bit included in each of the plurality of data units by analyzing each of the plurality of data units of the packet as soon as each of the plurality of data units separately arrives at the inspection logic circuit and generating control signals, which are an error-off signal and an error-on signal, according to comparison of the accumulatively computed error checking value and a cyclic redundancy check CRC calculated at a transmitter included in the packet when the last data unit of the packet arrives;
    a multiplexer for receiving data units and distributing the received data units as soon as the data units separately arrive at the multiplexer; and
    a plurality of first in and first out FIFO memories for receiving each of the plurality of data units from the multiplexer, storing each of the plurality of data units in corresponding FIFO memories and deleting or completing storing data units of a corresponding packet according to the control signals from the inspection logic circuit.

2. The apparatus as recited in claim 1, wherein the plurality of the FIFO memories includes:
    a memory controller for generating a full signal and an empty signal according to a state of a data address, generating and outputting a write allow signal when a write enable signal is activated and the full signal is inactivated, generating and outputting a read address when a read enable signal is activated and the empty signal is inactivated, controlling to perform one of delete and store the plurality of data units of the corresponding packet by controlling a write address value based on the control signals of the inspection logic circuit, outputting a read address copy data to a higher layer of the FIFO memories, controlling to perform one of deleting and storing the packet by controlling the read address by receiving a new address according to a packet control signal and read address copy data; and
    a dual port synchronous memory for storing input data at a write address inputted from the memory controller when a write allow signal is activated and outputting the input data stored a read address received from the memory controller.

3. The apparatus as recited in claim 2, wherein the dual port synchronous memory and memory controller includes:
    a first signal generator for receiving a write enable signal, a read enable signal and a first control signal and generating an empty signal and a write approval signal according to logical value of the received signals;
    a second signal generator for receiving a packet store signal, the read enable signal and the second control signal and generating the empty signal and the read approval signal according to logical values of the received signals; and
    an address controller for receiving the write allow signal and the control signals of the inspection logic circuit, generating the write address according to the received write allow signal and the control signals, outputting the write address to the dual port synchronous memory, outputting the read address copy data to the higher layer, receiving a read allow signal from the second signal generator, a new address according to the read address copy data and the packet dump signal from the higher layer, generating the read address according to the received read allow signal, the new address and the packet dump signal, outputting the generated read address to the dual port synchronous memory, generating the first control signal and second control signal and outputting the generated first control signal and the second control signal.

4. The apparatus as recited in claim 3, wherein the first signal generator includes:
    a first AND gate for receiving the write enable signal and the first control signal and performing an AND operation with the received write enable signal and the received first control signal;

a first selector for selecting and passing an output signal of the first AND gate when the full signal is a first logical state and selecting and passing a reversed value of the read enable signal when the full signal is a second logical state;

a full register for being set as '0' at initial mode and receiving and storing a signal from the first selector; and a second AND gate for receiving a reversed value of the output signal of the full register and the write enable signal and performing an AND operation of the reversed value of output signal of the full register and the write enable signal.

5. The apparatus as recited in claim 3, wherein the second signal generator includes:

a third AND gate for receiving the read enable signal and the second control signal and performing an AND operation with the received read enable signal and the received second control signal;

a second selector for selecting and passing an output signal of the third AND gate when the empty signal is a first logical state and selecting and passing a reversed value of the error-off signal when the empty signal is a second logical state;

an empty register for being set as '1' at an initial mode and receiving and storing an output signal from the second selector; and a fourth AND gate for receiving a reversed value of the output signal of the empty register and the read enable signal, performing an AND operation with the received reversed value of the output signal of the empty register and the read enable signal and outputting a result to the fourth AND gate.

6. The apparatus as recited in claim 3, wherein the address controller includes:

a decoder for generating address data by receiving the write allow signal, the error-on signal and the error-off signal and decoding the received write allow signal, the error-one signal and the error-off signal;

a first write address register for being set as '0', receiving and storing the address data from the decoder and receiving and storing a first write address data;

a first write boundary address register being set as '0', receiving and storing the address data from the decoder, receiving and storing the address data from the first write address register and outputting stored data to the first write address register as the first write boundary address data;

a second write address register for being set as '1' at an initial mode, receiving and storing an output address data from the decoder and receiving and storing a second write boundary address data;

a second write boundary address register for being set as '1' at an initial mode, receiving the output address data from the decoder, subtracting 1 from the received output address, storing a result of the subtracting, storing the address data from the second write address register and outputting the stored data as the second write boundary address data to the second write address register;

a third selector for receiving the error-on signal, outputting the address data of the first address register as the write address to the dual port synchronous memory when the error-on signal is a first logical state and outputting the first write boundary address data as the write address to the dual ports synchronous memory when the error-on signal is a second logical state;

a read address register for being set as '0', receiving a read allow signal from the second signal generator and the packet dump signal from the higher layer, outputting the read allow signal and the store address data according to the error-on signal and receiving and storing the new address from the higher layer;

a copy register for copying and storing the stored data at the read address register according to the read allow signal;

a fourth selector for outputting an output signal from the copy register as a read address when the read allow signal is a first logical state and outputting an output data of the read address register as a read address when the read allow signal is a second logical state;

a first comparator for comparing an output data of the second write address register and the read address register and generating a first control signal according to the result of the comparing; and a second comparator for comparing a result of subtracting 1 from the output data of the first write boundary address register and output data of the read address register and generating the second control signal according to the result of the comparing.

7. The apparatus as recited in claim 2, wherein the dual port synchronous memory includes:

a first selector for receiving the write address and outputting a first selection signal when the write allow signal is activated;

a register array for enabling a corresponding register according to the first selection signal inputted from the first selector and storing the input data to the corresponding register;

a read address register for receiving and storing the read address received from the memory controller; and a second selector for receiving the read address from the read address register and outputting a stored data at a register of the read address among the register array as an output data.

8. The apparatus as recited in claim 1, wherein the plurality of FIFO memories includes:

a memory controller for generating a full signal or empty signal according to a state of a data address, activating a write allow signal and generating and outputting a write address when a write enable signal is activated and the full signal is inactivated, generating and outputting a read address when a read enable signal is activated and the empty signal is inactivated and controlling the plurality of FIFO memories by controlling the write address by receiving the error-on signal and the error-off signal; and a dual ports synchronous memory for storing an input data at a write address received from the memory controller when the write allow signal is activated and outputting a stored data at the corresponding read address by receiving the read address from the memory controller.

9. A method for receiving a packet, which includes a plurality of data units, the method comprising:

receiving a data unit of the plurality of data units;

analyzing the data unit and simultaneously distributing the data unit to a corresponding FIFO memory;

performing simultaneously an error checking process by accumulatively computing an error checking value based on a redundancy bit included in each data units of the plurality of data units and finally comparing the accumulated computed error checking value with a CRC value sent from a transmitter of a corresponding packet as soon as the last data unit has arrived;

dumping the plurality of data units of the corresponding packet, if there is an error found as a result of the comparing; and processing data units outputted from the FIFO memories if there is not an error found as a result of the comparing.

10. The method as recited in claim 9, the method further comprising:

determining whether an error is included in the packet in a higher layer and returning back to processing the packet in the higher layer, if the error is not found; and dumping the packet, if the error is found.

* * * * *